(12) United States Patent
Cuissard et al.

(10) Patent No.: US 11,496,337 B2
(45) Date of Patent: Nov. 8, 2022

(54) OPENROAMING BASED REMOTE WORKER

(71) Applicant: Cisco Technology, Inc., San Jose, CA (US)

(72) Inventors: Vincent Cuissard, Haute-Savoie (FR); Domenico Ficara, Essertine sur Yverdon (CH); Amine Choukir, Lausanne (CH); Roberto Muccifora, Vaud (CH)

(73) Assignee: Cisco Technology, Inc., San Jose, CA (US)

( * ) Notice: Subject to any disclaimer, the term of this patent is extended or adjusted under 35 U.S.C. 154(b) by 110 days.

(21) Appl. No.: 17/148,481

(22) Filed: Jan. 13, 2021

(65) Prior Publication Data

US 2022/0224565 A1 Jul. 14, 2022

(51) Int. Cl.
*H04L 12/46* (2006.01)
*H04W 12/06* (2021.01)

(52) U.S. Cl.
CPC ...... *H04L 12/4641* (2013.01); *H04L 12/4633* (2013.01); *H04W 12/06* (2013.01)

(58) Field of Classification Search
CPC . H04L 12/4641; H04L 12/4633; H04W 12/06
See application file for complete search history.

(56) References Cited

U.S. PATENT DOCUMENTS

| | | |
|---|---|---|
| 7,469,294 B1 | 12/2008 | Luo et al. |
| 8,443,435 B1 | 5/2013 | Schroeder |
| 9,609,510 B2* | 3/2017 | Raleigh .................... H04L 63/08 |
| 10,075,906 B2* | 9/2018 | Kreiner .................. H04W 12/00 |
| 10,492,102 B2* | 11/2019 | Raleigh ................. H04W 28/10 |
| 10,826,945 B1* | 11/2020 | Xu ........................ H04L 9/0825 |
| 2006/0236378 A1* | 10/2006 | Burshan .............. H04L 63/0272 726/4 |
| 2010/0278174 A1 | 11/2010 | Isaksson et al. |
| 2014/0029512 A1* | 1/2014 | Chu .................. H04W 12/0431 370/328 |
| 2015/0188949 A1* | 7/2015 | Mahaffey .............. H04W 12/37 726/1 |

(Continued)

FOREIGN PATENT DOCUMENTS

| | | |
|---|---|---|
| WO | 2004013986 A1 | 2/2004 |
| WO | WO2011035667 | 3/2011 |
| WO | 2011147334 A1 | 12/2011 |

OTHER PUBLICATIONS

"Chapter: Managing Remote Access VPNS"; Cisco End User-Guides, Oct. 8, 2020.

(Continued)

*Primary Examiner* — Blake J Rubin
(74) *Attorney, Agent, or Firm* — Merchant & Gould P.C.

(57) ABSTRACT

A method for establishing a VPN with a client device is provided. In the method, an AP can receive an access request directed to an OpenRoaming (OR) Service Set Identifier (SSID) from the client device. The AP can send the access request to an OR connector. In response to the access request, the AP may receive an access response from the OR connector. The access response can include an attribute indicating an address to connect to a company Virtual Private Network (VPN) headend. The AP may then use the attribute to establish the VPN connection with the company VPN headend.

20 Claims, 10 Drawing Sheets

(56) References Cited

U.S. PATENT DOCUMENTS

| | | |
|---|---|---|
| 2017/0187688 A1 | 6/2017 | Hodroj |
| 2017/0223013 A1* | 8/2017 | Brown ................ H04W 12/069 |
| 2017/0230905 A1* | 8/2017 | Pularikkal ............. H04W 48/14 |
| 2019/0200283 A1* | 6/2019 | Graybeal ............... H04W 48/18 |
| 2019/0373526 A1* | 12/2019 | Chow ................... H04W 36/22 |
| 2020/0163013 A1 | 5/2020 | Grayson et al. |
| 2020/0389457 A1 | 12/2020 | Olofsson et al. |
| 2022/0124167 A1* | 4/2022 | Canpolat ............... H04L 67/306 |

OTHER PUBLICATIONS

International Search Report and Written Opinion issued in corresponding International Patent Application No. PCT/US2022/012161, dated Apr. 25, 2022.

* cited by examiner

OPENROAMING BASED REMOTE WORKER

TECHNICAL FIELD

The present disclosure relates generally to wireless networks.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Wireless networks can provide access for workers to work in remote locations.

However, providing access for these remote workers is not easy, especially for small and medium businesses, where Information Technology (IT) staff is limited and usually have limited experience in domains like Virtual Private Networks (VPNs) and authentication. Some existing solutions rely on specific devices owned and managed by the company to be deployed in the employee's home. These devices are often expensive and require management and expensive support. Due to these problems, many companies fail to take advantage of the benefits of allowing workers to work remotely.

BRIEF DESCRIPTION OF THE FIGURES

The accompanying drawings, which are incorporated in and constitute a part of this disclosure, illustrate various example of the present disclosure. In the drawings.

DETAILED DESCRIPTION

Overview

Figure 1A:
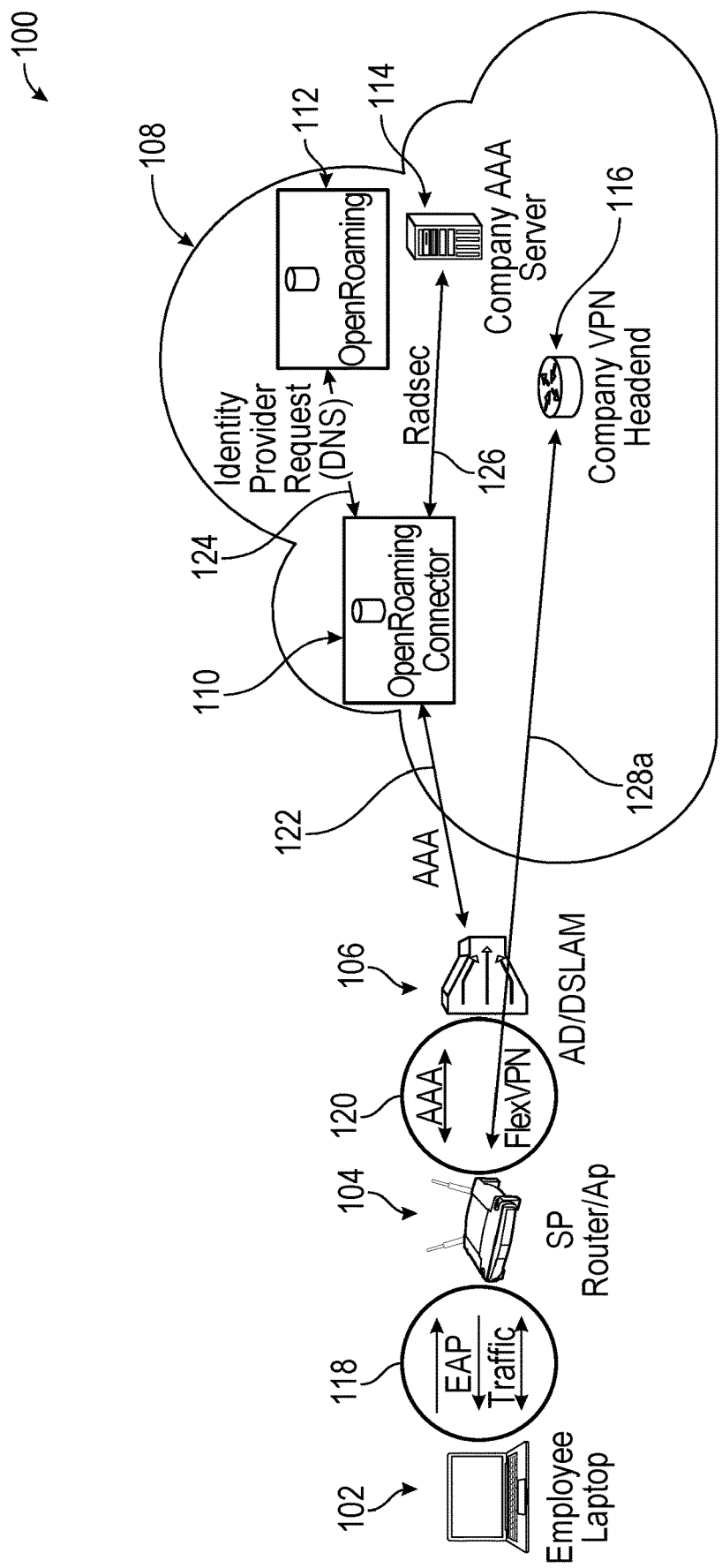
FIG. 1A is a block diagram of wireless network environment in accordance with aspects of the present disclosure.

An optimal method for establishing a VPN with a client device is provided. In the method, an AP can receive an access request directed to an OpenRoaming (OR) Service Set IDentifier (SSID) from the client device. The AP can send the access request to an OR connector. In response to the access request, the AP may receive an access response from the OR connector. The access response can include an attribute indicating an address to connect to a company Virtual Private Network (VPN) headend. The AP may then use the attribute to establish the VPN connection with the company VPN headend.

Both the foregoing overview and the following description are examples and explanatory only, and should not be considered to restrict the disclosure's scope, as described and claimed. Furthermore, features and/or variations may be provided in addition to those described. For example, examples of the disclosure may be directed to various feature combinations and sub-combinations described in the implementations.

EXAMPLE

The following detailed description refers to the accompanying drawings. Wherever possible, the same reference numbers are used in the drawings and the following description to refer to the same or similar elements. While example (s) of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Remote worker solutions can have similar architectures. A company can provide a device (usually a router or an Access Point (AP)) and an employee connects the router/AP behind the home router. Depending on the solution, a VPN is established between the router/AP and the VPN headend/ Wireless Local Area Network (WLAN) Controller (WLC) of the company. The provisioning of this VPN can be done manually (by IT technician or the employee) or through Plug and Play (PnP) (e.g. through a virtual office). People at home can already have a router and an AP. Thus, the aspects herein can leverage these existing devices and work with a Service Provider (SP) to provide a solution that does not require new devices, as required in the past.

Aspects herein solve various issues to allow for remote worker access and provides various benefits. First, the remote user has to be authenticated by the organization. Second, the traffic between the remote worker and the company is to be secured. Third, it is also beneficial that the employee need not make any configuration changes.

Aspects herein provide support for OpenRoaming (OR) in the SP, including in the Home GateWay (HGW), or the Access Device (AD) connected to the home gateway. Open-Roaming can provide enterprise grade authentication through dot11 (or future dot1x standards). The implementations herein are easier to manage for the company because these implementations do not need to have separate peer to SP connections for each client but can make one or a few connections to the OpenRoaming foundation (as an identity provider). The enterprise can choose which SPs to accept VPN service from based on billing agreements or other arrangements.

To ensure a secure link, OpenRoaming can pass additional Authentication, Authorization, Accounting (AAA) attributes that can contain VPN setup information. The HGW/AD and the VPN headend can be registered as part of the Open-Roaming Public Key Infrastructure (PKI). The HGW or AD can then establish a VPN based on the information provisioned by the AAA message(s).

Initially, a company can provide an IDentity Provider (IDP) for the company's domain to the OpenRoaming foundation and then register the OpenRoaming foundation to a PKI. An OpenRoaming connector can authenticate to the enterprise IDP using the PKI. A wireless client can then join an OpenRoaming-compatible Service Set IDentifier (SSID) using a hotspot 2.0 feature. This SSID is configured to do dot1x authentication. When an Extensible Authentication Protocol (EAP)-IDENTITY is received, then the HGW or AD can start a Remote Authentication Dial-in User Service (RADIUS) communication with the OpenRoaming connector. The OpenRoaming connector can be either implemented natively on the HGW/AD or as a standalone service hosted on the Service Provider (SP) or cloud hosted.

The Service Provider (SP) can configure an OpenRoaming-enabled SSID on the customer's home AP. This SSID is configured for dot1x using the OpenRoaming connector as an AAA server. The OpenRoaming connector can use the EAP-IDENTITY domain to lookup the AAA server of the enterprise and then can establish a RADIUS over Transmission Control Protocol (TCP)/User Datagram Protocol (UDP) (RADSEC) tunnel to authenticate the employee's device.

During the authentication phase, the enterprise AAA server can provide and send an AAA-CISCO-REMOTE-WORKER-VPN attribute with a VPN headend Fully Qualified Domain Name/Internet Protocol (FQDN/IP) address. The AAA backend can authorize the VPN establishment at the VPN headend. The HGW/AD can then extract this attribute and establish a VPN (e.g. FlexVPN) connection with the VPN headend.

To establish the VPN, the SP HGW/AD can use its OpenRoaming certificate. The enterprise VPN headend and HGW/AD can mutually authenticate using the OpenRoaming PKI. After establishing the VPN, usual home device traffic may be split from the VPN allowing both types of traffic to co-exist, and local home resources stay accessible while the VPN is established.

The architecture implementations allow for the establishment of the VPN by the HGW. An alternative implementation may be implemented in the Access Device (AD), the security between the HGW and the AD can be managed by the SP. This configuration can ease the deployment effort and management effort for the SP. In this implementation, the AD equipment can either host the OpenRoaming connector or use the OpenRoaming connector as a standalone service hosted at the SP or in the cloud.

The VPN can also be established at the AD level (which can be offloaded to a router). In this architecture implementation, an AAA-OVERRIDE feature can move the client to a dedicated Virtual Local Area Network (VLAN) to allow traffic routing and segregation (normal home SSID traffic shall not go through VPN).

Companies often need to provide quickly remote working solutions for a remote-working employee. Current secured solutions are difficult to establish and expensive, which can be a disincentive for small businesses. Aspects herein reuse devices that employees already have at home: an home router and AP usually managed by their SP. However, these devices are used in new ways. The SP can implement OpenRoaming (either on a home router or at a Digital Subscriber Line Access Multiplexer (DSLAM) level). The company registers an OpenRoaming IDP (AAA server) to an OpenRoaming foundation. Then, the employee can join the OpenRoaming SSID and authenticate herself using her company credentials with his company's IDP. A FlexVPN can then be established by using IDP information and an OpenRoaming PKI (Service Provider and Company's IDP certificates).

Figure 1B:
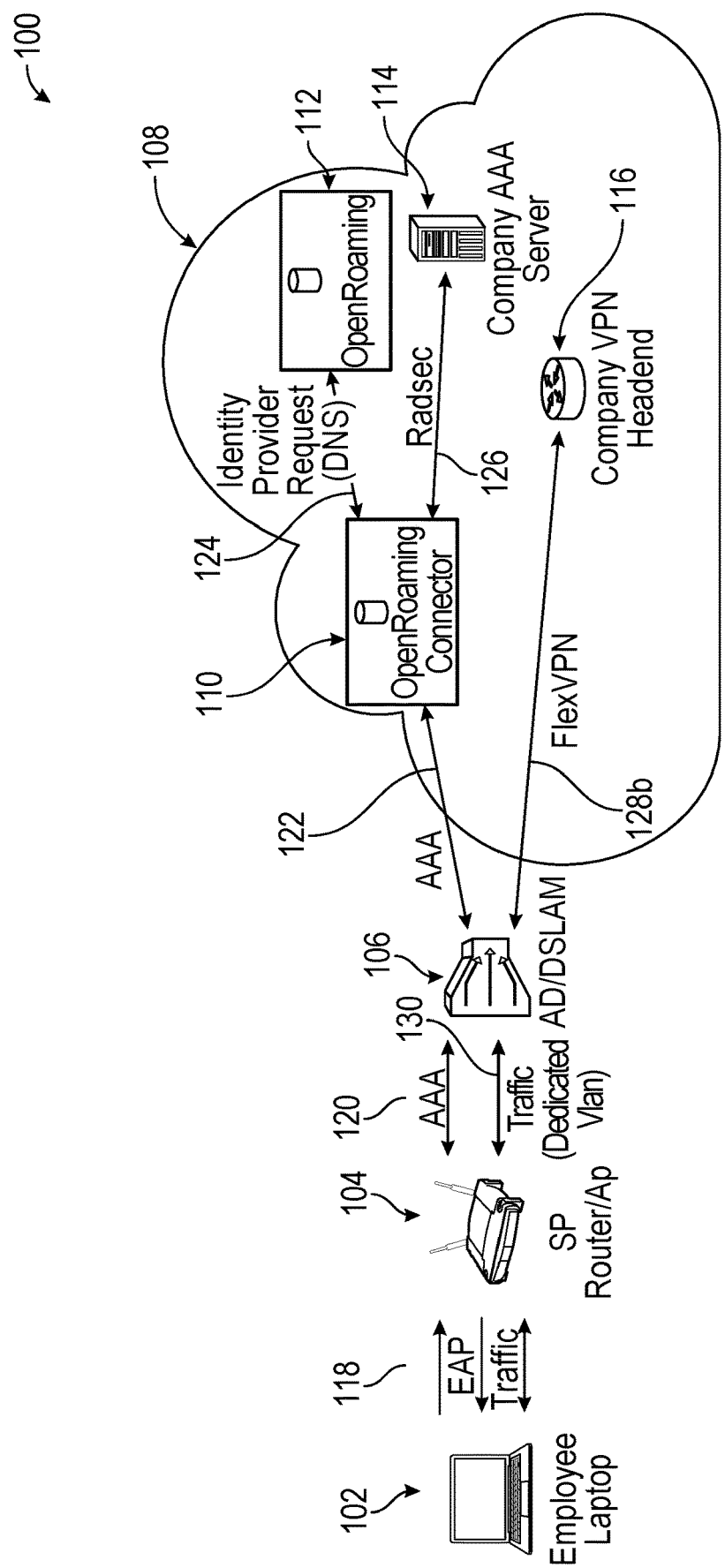
FIG. 1B is another block diagram of wireless network environment in accordance with aspects of the present disclosure.

Implementations of a wireless environment 100 may be as shown in FIGS. 1A and 1B. The wireless environment 100 can include one or more of, but is not limited to, an employee computing system, for example, an employee laptop 102, a SP which can be a router and/or an AP 104, a Digital Subscriber Line Access Multiplexer (also referred to as the AD) 106, and one or more systems within a cloud 108. The systems within the cloud 108 can include one or more of, but are not limited to, an OpenRoaming connector 110, an OpenRoaming server 112, a company AAA server 114, and/or a company VPN headend 116. These one or more systems 102 through 116 can be wireless devices 930, as described in conjunction with FIG. 9B. Further, the systems can also be computing systems 600 as described in conjunction with FIG. 9A.

The wireless environment 100 can include a WLAN, which may be referred to as WLAN 100, network 100, wireless environment 100, etc., and which can include one or more APs 104. The wireless environment 100 shows just a single AP 104, but the wireless environment 100 can include two or more APs 104. The APs 104 can communicate with each other to conduct operations in concert.

The APs 104 may be in communication with one or more clients 102, which may also be referred to simply as devices 102, via signals 118. The clients 102 may be physically dispersed through a physical area covered by APs 104 of the WLAN 100. The clients 102 and the APs 104 may be wireless devices, as described in conjunction with FIG. 9B and may be computing systems, as described in conjunction with FIG. 9A. The network 100 can be controlled by a controller (not shown), e.g., a WLC, a network controller, etc. The controller may be a computer system, wireless device, and/or another device, as described in conjunction with FIGS. 9A and 9B.

As stated above and as shown in FIGS. 1A and 1B, the wireless network 100 may comprise Wi-Fi APs 104 that may be configured to support a wireless (e.g., Wi-Fi) network 100. The APs 104 may comprise a physical location where a user, operating a client 102, may obtain access to a wireless network 100 (e.g., Internet access), using Wi-Fi technology, via a WLAN using a router connected to a service provider.

In another example(s) of the disclosure, rather than APs 104, devices may be used that may be connected to a cellular network that may communicate directly and wirelessly with end use devices (e.g., a client 102 device) to provide access to wireless network 100 (e.g., Internet access). For example, these devices may comprise, but are not limited to, eNodeBs (eNBs) or gNodeBs (gNBs). The aforementioned cellular network may comprise, but is not limited to, a Long Term Evolution (LTE) broadband cellular network, a Fourth Generation (4G) broadband cellular network, or a Fifth Generation (5G) broadband cellular network, operated by a service provider. Notwithstanding, example of the disclosure may use wireless communication protocols using, for example, Wi-Fi technologies, cellular networks, or any other type of wireless communications.

Client devices 104 may comprise, but are not limited to, a phone, a smartphone, a digital camera, a tablet device, a laptop computer, a personal computer, a mobile device, a sensor, an Internet-of-Things (IoTs) device, a cellular base station, a telephone, a remote control device, a set-top box, a digital video recorder, a cable modem, a network computer, a mainframe, a router, or any other similar microcomputer-based device capable of accessing and using a Wi-Fi network or a cellular network.

An AD 106 can be any computing system or circuit that can connect a user device 102 to a network, e.g., the company's network. More generally, an AD 106 can be a device that, when connected to, provides access to a larger communication network of some sort, e.g., cloud 108. When used in broadband, an AD 106 can include the subscriber equipment required to make a connection 120 to a wide area network (WAN) from a local area network (LAN), e.g., the AP 104. The AD 106 can include a router, modem, and a power supply. In a residential or business network, the AD 106 may include other APs or switches.

A type of AD 106 can include a DSLAM. The DSLAM 106 can be any network device that connects multiple customer Digital Subscriber Line (DSL) interfaces to a high-speed digital communications channel using multiplexing techniques. The DSLAM 106 can collect data from many modem ports and aggregate the data traffic into one complex composite "signal" via multiplexing. Depending on the type of implementation, the DSLAM may aggregate the DSL lines over an Asynchronous Transfer Mode (ATM), a frame relay, and/or an Internet Protocol (IP) network. The aggregated traffic (signals 122 and/or 128a, 128b) can then be directed to a backbone switch, for example, over an Access Network (AN), also called a Network Service Provider (NSP).

The DSLAM 106 can act like a network switch. The DSLAM may not re-route traffic between multiple IP networks, but between Internet Service Provider (ISP) devices and end-user connection points. The DSLAM traffic can be switched to a Broadband Remote Access Server where the end-user traffic is then routed across the network to the Internet. Customer-premises equipment that interfaces with the DSLAM may take advantage of enhanced signaling features and the bandwidth monitoring and compensation capabilities the DSLAM 106 supports.

The OpenRoaming service can include an OpenRoaming server 112 and/or an OpenRoaming connector 110. OpenRoaming is a roaming federation service enabling an automatic and secure Wi-Fi experience globally. While OpenRoaming is used herein, any open roaming federation may be used in the methods and systems herein. OpenRoaming can provide an open connectivity framework for organizations in the wireless ecosystem. OpenRoaming exposes a federation of networks and identity providers, allowing users to join any network managed by a federation member. Companies who join OpenRoaming allow interoperation between each other to deliver an automatic and secure connected Wi-Fi experience. OpenRoaming can manage PKI registrations, interconnection tech, centralized policies and global identifiers, Wireless Remote Access (WRA) Wi-Fi network ID for partners (WRAID), Wireless Roaming Intermediary eXchange (WRIX) standard, etc. OpenRoaming enabled networks can automatically onboard users securely leveraging established identity providers such as operators, cloud IDs, loyalty membership, bridging the gap between Wi-Fi and cellular networks.

The OpenRoaming server 112 can be a computing system as explained hereinafter. The OpenRoaming connector 110 can be a service or device that interfaces with the OpenRoaming server 112, in signals 124, and/or is an instance that can communicate with the enterprise systems, e.g., the company AAA server 114, in signals 126.

The company AAA server 114 can be a computing system that provides network access. The company AAA server 114 can conduct operations using one or more network protocols, e.g., the RADIUS protocol, and the Diameter counterpart Protocol. In some implementations, the company AAA server 114 can provide Internet Protocol (IP) functionality to support the functions of authentication, authorization and accounting.

The company VPN headend 116 can also be a computing system or service that provides access to a VPN. A VPN can extend a private network across a public network and enables users to send and receive data, in signals 130, across shared or public networks as if their computing devices were directly connected to the private network. Applications running across a VPN may therefore benefit from the functionality, security, and management of the private network. Encryption is a common, part of a VPN connection. The VPN can allow for an IP SECurity (IPSEC) Tunnel that can use other protocols. The VPN can combine multiple frameworks into a single, comprehensible set of Common Language Infrastructure (CLI)/Application Programming Interface (API) commands to help the setup of remote access, site-to-site, and VPN topologies.

The elements described above of the wireless network 100 (e.g., WLC, AP 104, client devices 102, AD 106, OR connector 110, OR server 112, AAA server 114, VPN headend 116, etc.) may be practiced in hardware, in software (including firmware, resident software, micro-code, etc.), in a combination of hardware and software, or in any other circuits or systems. The elements of wireless network 100 may be practiced in electrical circuits comprising discrete electronic elements, packaged or integrated electronic chips containing logic gates (e.g., Application Specific Integrated Circuits (ASIC), Field Programmable Gate Arrays (FPGA), System-On-Chip (SOC), etc.), a circuit utilizing a microprocessor, or on a single chip containing electronic elements or microprocessors. Furthermore, the elements of wireless network 100 may also be practiced using other technologies capable of performing logical operations such as, for example, AND, OR, and NOT, including but not limited to, mechanical, optical, fluidic, and quantum technologies. As described in greater detail below with respect to FIGS. 9A and 9B, the elements of wireless network 100 may be practiced in a computing device 900 and/or wireless device 930.

Figure 3:
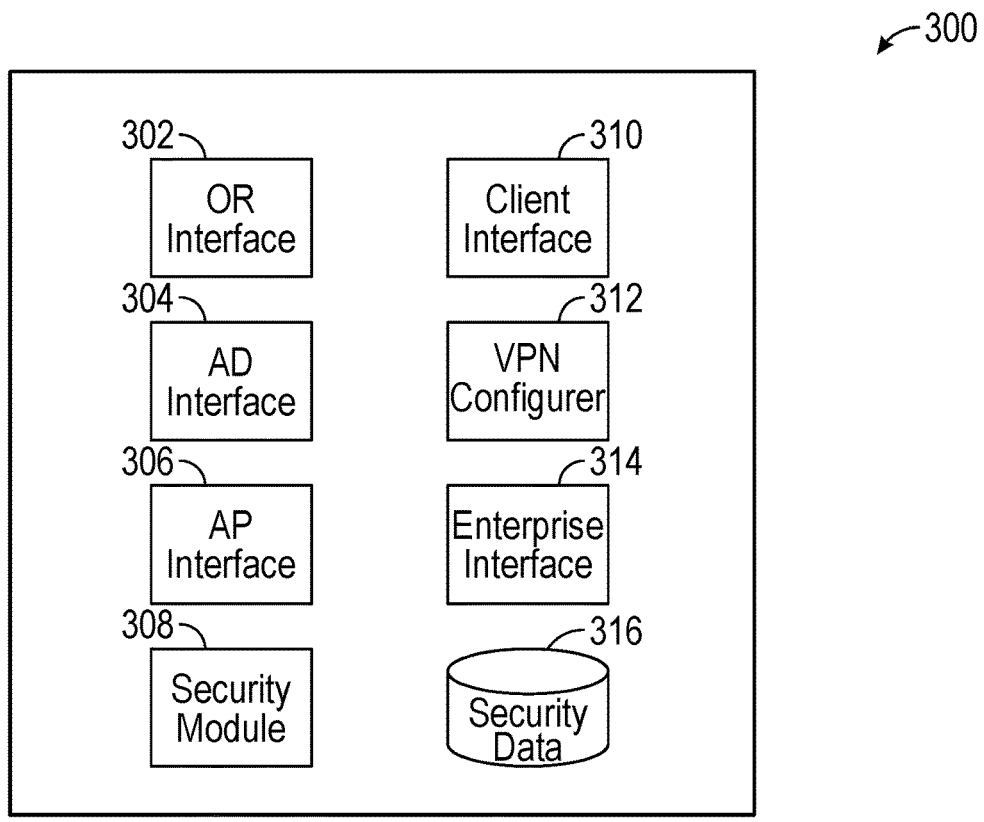
FIG. 3 is a block diagram of device components in accordance with aspects of the present disclosure.
Figure 9A:
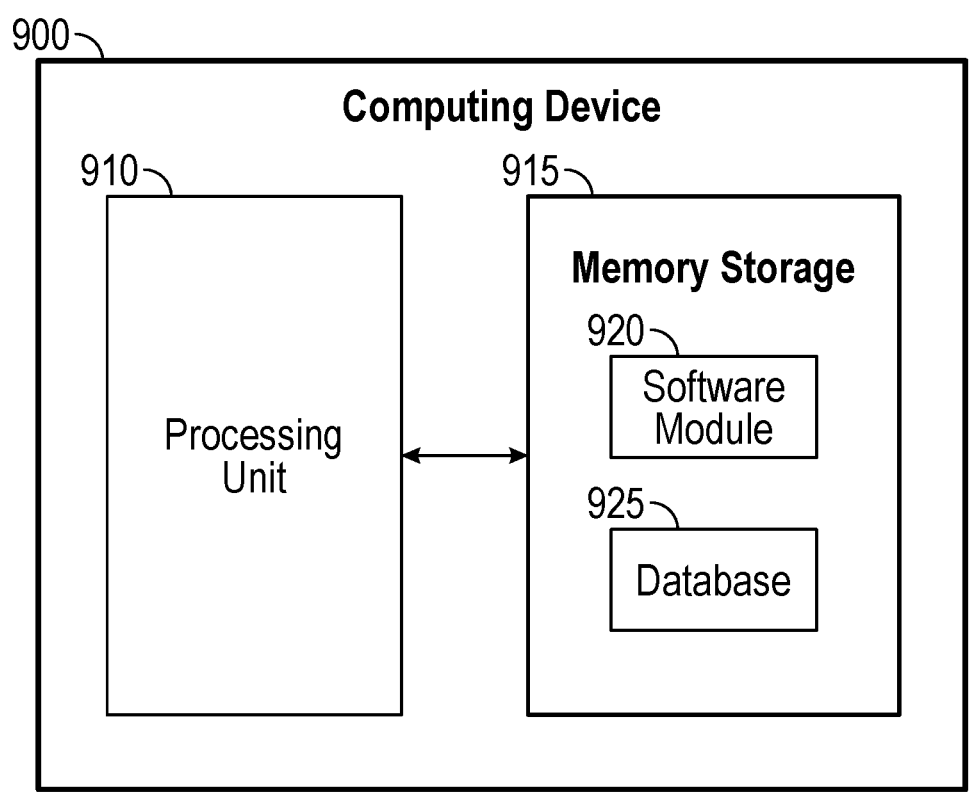
FIG. 9A is a block diagram of a computing device in accordance with aspects of the present disclosure.

An implementation of components 300, associated with any of the one or more devices, systems, servers, etc. 102-116, for conducting operations contained herein may be as shown in FIG. 3. The components 300 may be part of or executed as part of the computing system 900 as is shown in FIG. 9A. These components 300 can include one or more of, but are not limited to, an OpenRoaming interface 302, an AD interface 304, an AP interface 306, a security module 308, a client interface 310, a VPN configurer 312, an enterprise interface 314, and/or security data 316. Each of these modules may be executed as software by a computing system 900. In other implementations, the one or more components 300 may be hardware, or combination of hardware and software. In other implementations the components 300 may represent gates in an ASIC, a FPGA, a SOC, or some other type of hardware implementation.

The OpenRoaming interface 302 is operable to interface with the OpenRoaming server 112 and/or the OpenRoaming connector 110. The OpenRoaming interface 302 may exchange information or data with the OpenRoaming components 110, 112 based on a standard required by the OpenRoaming standard. The OpenRoaming interface may be integrated in the DSLAM 106, the AP 104, or another device. Further, the company AAA server 114 may also include an OpenRoaming interface 302 to communicate with the OpenRoaming connector 110.

The AD interface 304 can include any processes or systems to implement communications with the AD 106. The AD 106 can be the DSLAM 106. The AD interface 304 may be included in the company VPN headend 116, in the OpenRoaming connector 110, and/or the employee laptop 102. Further, the AP 104 can also include the AD interface 304. The AD interface 304 may be operable to exchange communications with the AD 106. This exchange of communications may be based on standard protocol as required by the AD 106.

The AP interface 306 can include any components or mechanisms to communicate with AP 104. The AP interface 306 can be included in the AD 106 and/or the employee computing system 102. This AP interface 306 allows for communication to and from the AP 104.

The security module 308 can be included in the AP 104, the AD 106, the company VPN headend 116, and/or the employee laptop 102. Security module 308 may be responsible for composing or conducting security communications between the various components. The client interface 310 can include any type of interface required to communicate the client laptop 102. The client interface may be integrated in the AP 104.

The VPN configurer 312 can be any component used to establish and maintain a VPN for the client laptop 102. The VPN can be created by the AP 104 and/or the AD 106. The VPN configurer 312 may thus be incorporated in the AP 104 or the AD 106.

The enterprise interface 314 can be any type of mechanism operable to communicate with the company AAA server 114, the company VPN headend 116, or other company servers. Thus, the enterprise interface 314 can conduct communications or format the type of communications to or from the company components 114, 116. The enterprise interface 240 may be included in the AP 104, the AD 106, or the OpenRoaming connector 110.

Security data 316 can include any of the types of stored data, including security keys, client identifiers (IDs), or other types of information used to authenticate and identify the client 102. This information may be stored variously at the company AAA server 114, the OpenRoaming server 112, the company VPN headend 116. Some security data may be stored at the other components 102 through 106, or in a physically separated in cloud storage or otherwise. In order to allow for authentication of the client and use of the VPN.

Figure 4:
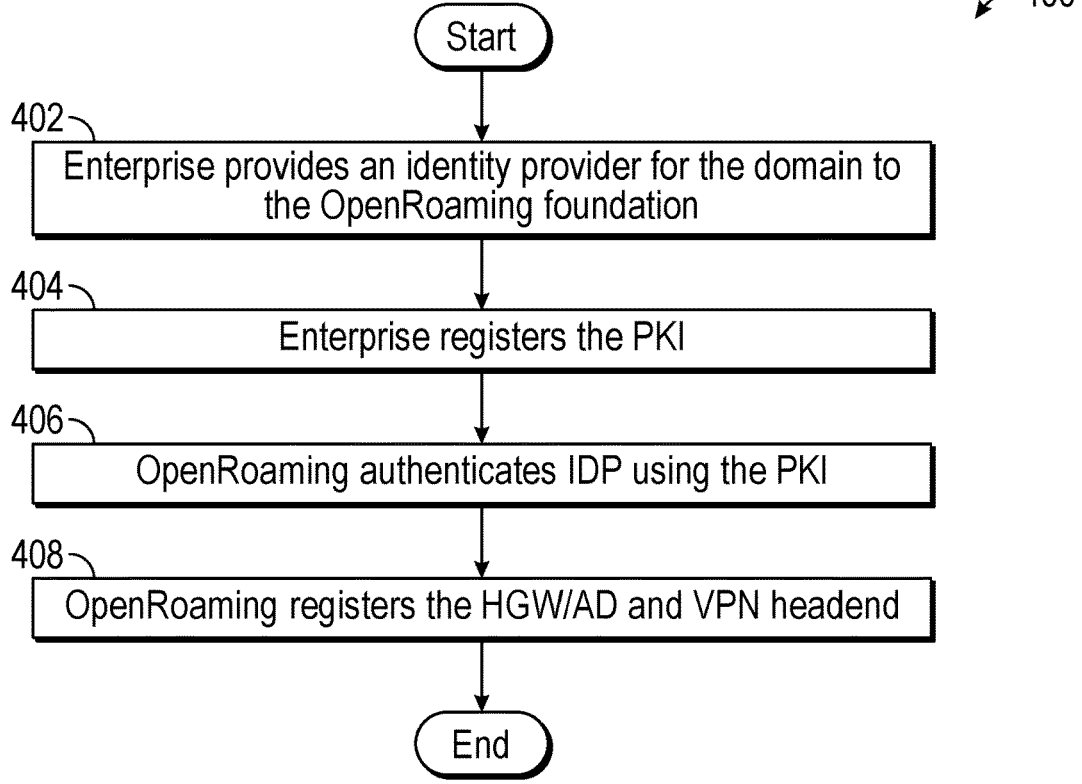
FIG. 4 is a flow chart of a method for providing remote access in accordance with aspects of the present disclosure.
Figure 5:
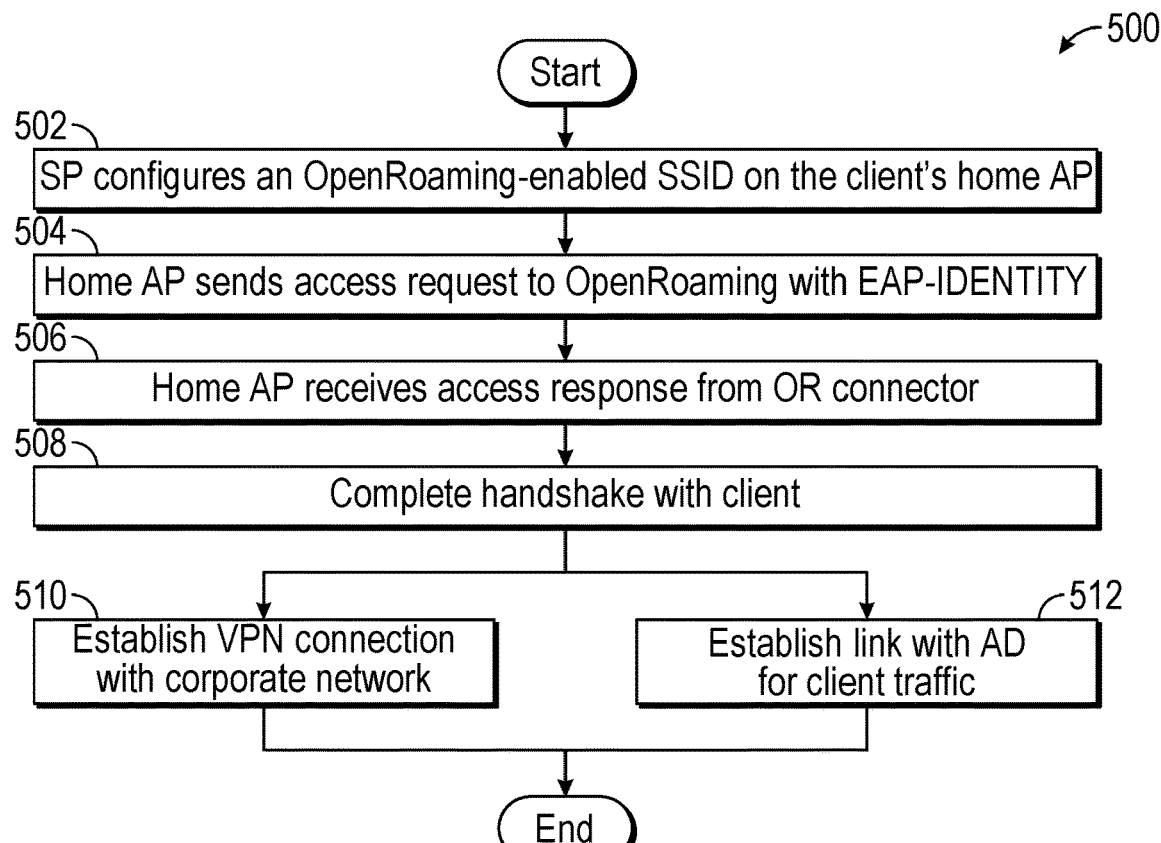
FIG. 5 is another flow chart of a method for providing remote access in accordance with aspects of the present disclosure.

Referring now to the method 400 of FIG. 4, the method 400 shows the establishment of a relationship between the OpenRoaming server 112 or OpenRoaming service and the enterprise. The method 400 can start with a start operation and can end with an end operation. The method 400 can include more or fewer stages or can arrange the order of the stages differently than those shown in FIG. 4. The method 400 can be executed as a set of computer-executable instructions, executed by a computer system or processing component, and be encoded or stored on a storage medium. Further, the method 400 can be executed by a gate or other hardware device or component in an ASIC, a FPGA, a SOC, or other type of hardware device. Hereinafter, the method 400 shall be explained with reference to the systems, components, modules, software, signals, data structures, etc. described herein.

An enterprise server, for example, the company AAA server 114, may provide an Identity Provider (IDP) for the enterprise's domain to the OpenRoaming server 112, in stage 402. The provision of the IDP allows the OpenRoaming server 112 to establish a secure connection with the enterprise server AAA 114. The IDP is a system that creates, maintains, and manages identity information for principles, for example, the OpenRoaming server 112 provides authentication services to applications within the network. Thus, the IDP allows for the OpenRoaming server 112 to provide authentication services, for users, for the company. Further, the IDP allows the OpenRoaming server 112 to direct the OpenRoaming connector 110 to communicate with the company AAA server 114 to authenticate clients 102 communicating with the OpenRoaming system 112.

The enterprise server AAA 114 may then register the Public Key Infrastructure (PKI) information with the OpenRoaming server 112, in stage 404. Registration allows the OpenRoaming system to authenticate the IDP with the enterprise by using the PKI keys provided by the enterprise. The PKI can include any keys or other information required by the OpenRoaming connector to authenticate to the company AAA server 114.

The OpenRoaming server 112 can authenticate the IDP using the PKI, in stage 406. The OpenRoaming server 112 can instantiate or connect to an OpenRoaming connector 110 to communicate with the company AAA server 114. The OpenRoaming connector 110 can authenticate the IDP provided or generated by the OpenRoaming server 112 using the PKI. Authentication of the OpenRoaming connector 110 allows for the OpenRoaming system to authenticate users thereinafter, with the AAA server 114.

The OpenRoaming server 112 can then register the Home GateWay (HGW) or AD 106, with the VPN headend 116, in stage 408. The company system can provide the HGW VPN information to the OpenRoaming connector 110. In other implementations, the employee device 102 can provide the HGW 104 or AD 106 information. This information allows the AAA server 114 to pass VPN information on to the client 102 to establish the VPN with the company VPN headend 116.

Figure 6:
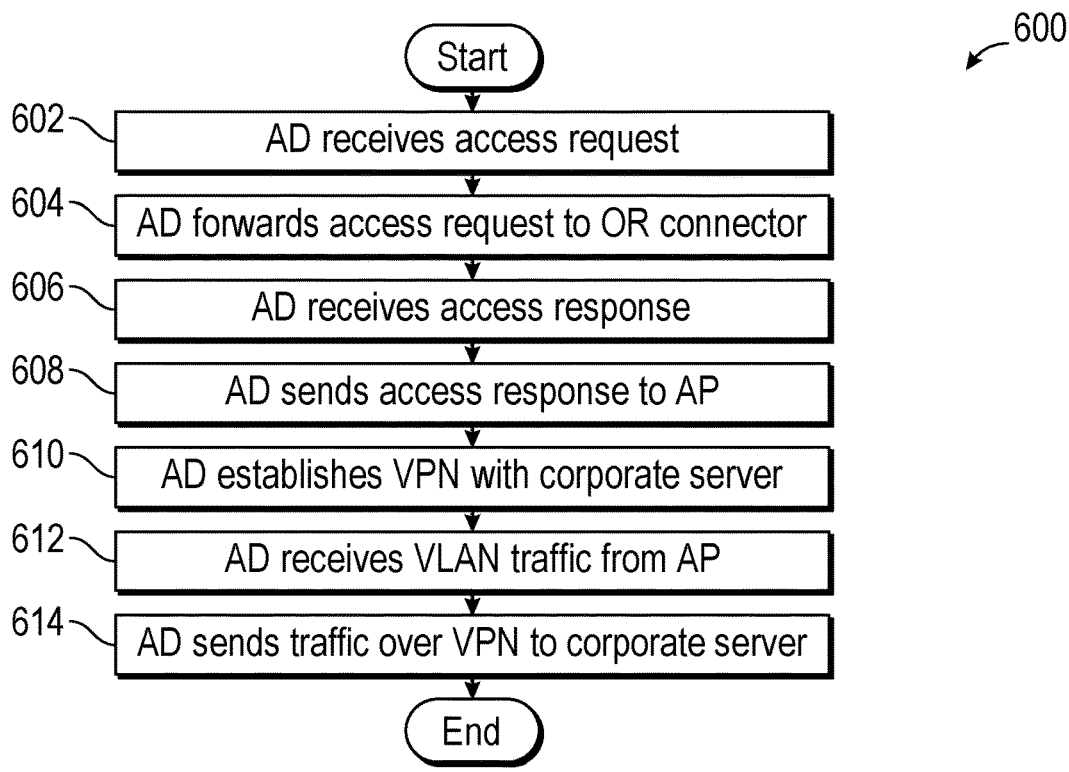
FIG. 6 is another flow chart of a method for providing remote access in accordance with aspects of the present disclosure.
Figure 7:
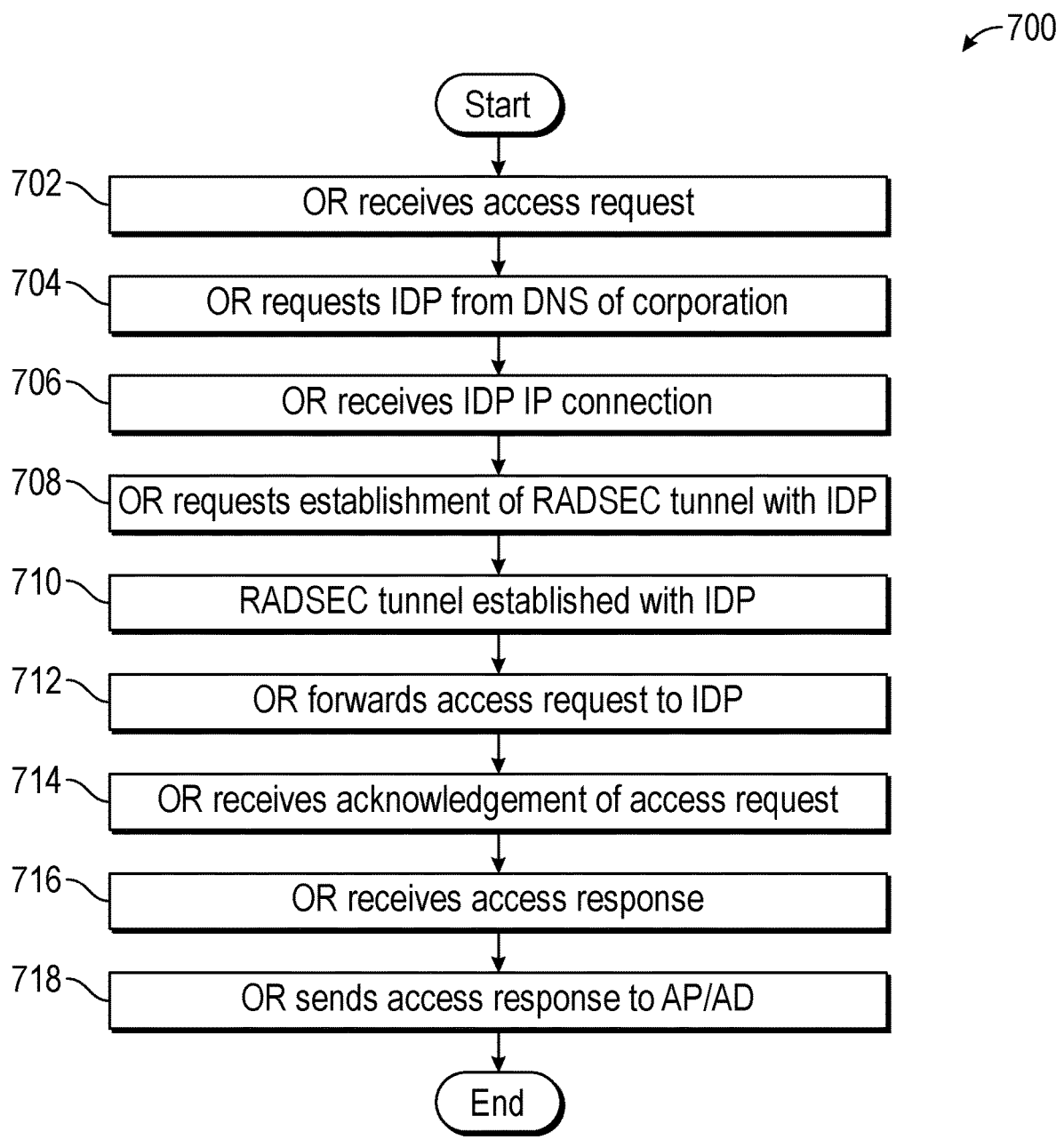
FIG. 7 is another flow chart of a method for providing remote access in accordance with aspects of the present disclosure.
Figure 8:
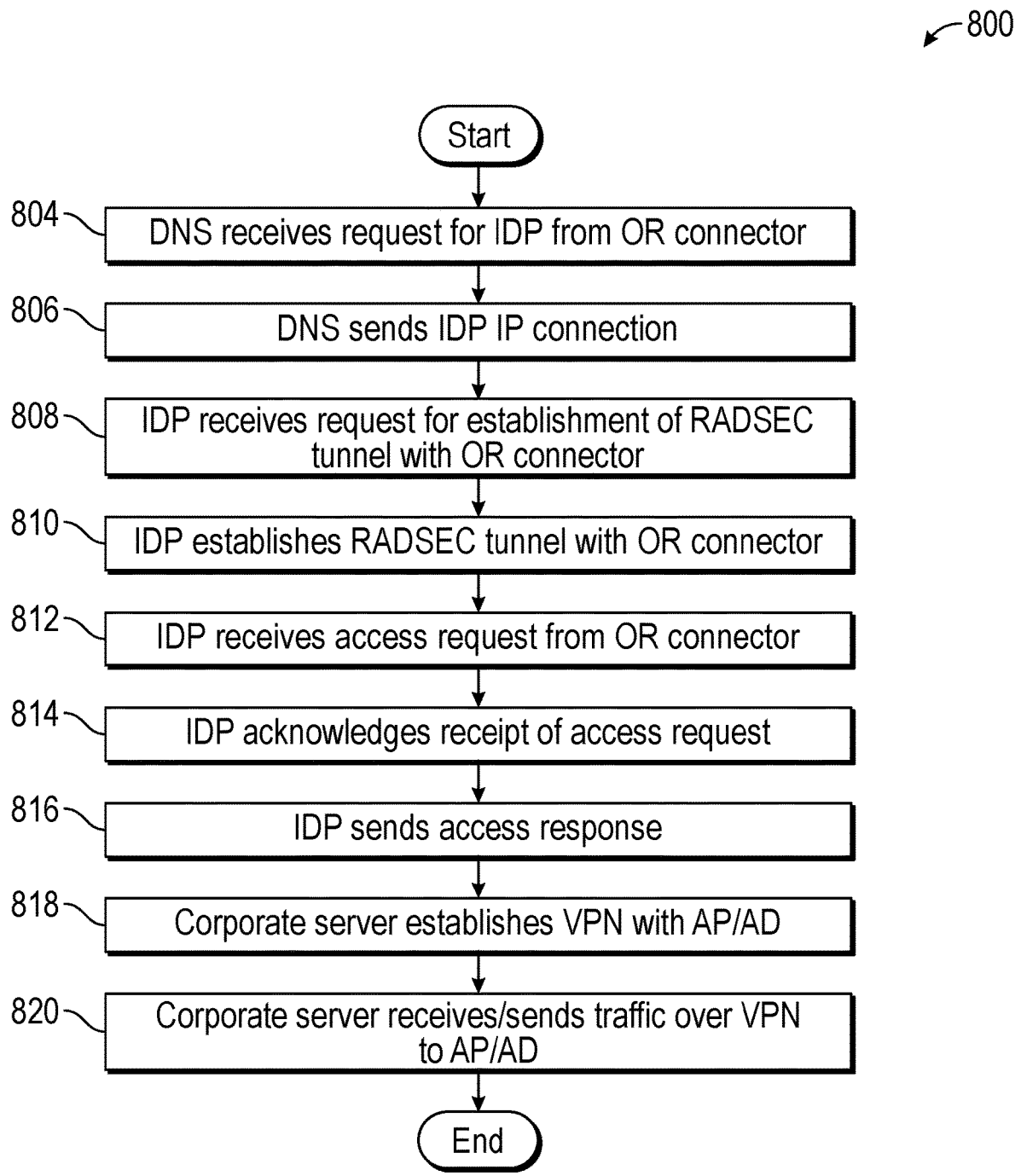
FIG. 8 is a flow chart of a method for providing remote access in accordance with aspects of the present disclosure.

Now referring to FIGS. 5-8, which provide implementations of methods 500, 600, 700, and 800 for using the OpenRoaming system 112 to authenticate users for VPN configurations. The method methods 500, 600, 700, and 800 can start with a start operation and can end with an end operation. The methods 500, 600, 700, and 800 can include more or fewer stages or can arrange the order of the stages differently than those shown in FIGS. 5, 6, 7, 8. The methods 500, 600, 700, and 800 can be executed as a set of computer-executable instructions, executed by a computer system or processing component, and be encoded or stored on a storage medium. Further, the methods 500, 600, 700, and 800 can be executed by a gate or other hardware device or component in an ASIC, a FPGA, a SOC, or other type of hardware device. Hereinafter, the methods 500, 600, 700, and 800 shall be explained with reference to the systems, components, modules, software, data structures, etc. described herein. Different figures may be associated with the different systems within FIGS. 1A and 1B. For example, FIG. 5 applies to operations conducted by the SP 104 and/or the employee computing system 102. FIG. 6 applies to the AD 106. FIG. 7 applies to the OpenRoaming connector 110 and/or OpenRoaming system 112. Finally, the method 800, in FIG. 8, is associated with the company AAA server 114 or the company VPN headend 116. The methods 500-800 will be explained in conjunction with the components of FIG. 3, the systems of FIGS. 1A and 1B, and/or the signaling diagrams of FIGS. 2A and 2B, in accordance with aspects of the disclosure.

ASP 104 configures an OpenRoaming-enabled SSID on the client's home AP 104, in stage 502. The SSID is a unique identifier for a particular network. The SSID can be a numeric, alphanumeric, Globally Unique Identifier (GUID), an Internet Protocol (IP) address, etc. The SSID on the client's home AP 104 is enabled for dot11x/1x authentication. Dot1x/Dot11 is a fast, secure and reliable Wi-Fi service which allows network connectivity. The wireless client 102 can be provided log-in credentials. The credentials can allow for a log in to dot1x/dot11. Further, the SSID is configured such that the OpenRoaming Connector 110 is indicated as the AAA server for the client 102. Thus, when trying to authenticate, the client 102 contacts the OpenRoaming Connector 110

This configuration allows the authentication of the wireless client to the OpenRoaming system and/or the enterprise system. To connect to the AP 104, the wireless client 102 may scan for the AP 104 with signal 202. The AP 104 may send one or more beacons 204 from the AP 104 to the wireless client 102. The beacons 204 can include information to connect with the AP 104. Further, these beacons may include the OpenRoaming compatible SSID for the AP 104. In this way, the wireless client 102 can receive information for how to connect to the OpenRoaming SSID.

The client 102 may then send dot11/1x authentication request 206 to the AP 104. This request 206 can be sent to the SSID provided in the beacon 204. The AP 104 can respond with signal 208 for an Extensible Authentication Protocol (EAP) request. This EAP request 208 can request the identity of the wireless client 102. The client 102 may then send an EAP response, with the identity of the wireless client 102, in signal 210. The identity can include any kind of authentication information, for example, an email address, a username, a password, etc. The client interface 310 of the AP 104 can receive the EAP response.

The AP 104 may then send the access request, including the identity information received from the client, to the OpenRoaming connector 110 (see FIGS. 1A and 2A) or the AD 106 (see FIGS. 1B and 2B), in stage 504. This request can include the EAP identity received from the wireless client 102. The AD interface 304 may send the access request 212b to the AD 106. In other implementations, the OpenRoaming interface 302, of the AP 104, can send the access request 212a, with the identity, directly to the OpenRoaming (OR) connector 110.

Figure 2A:
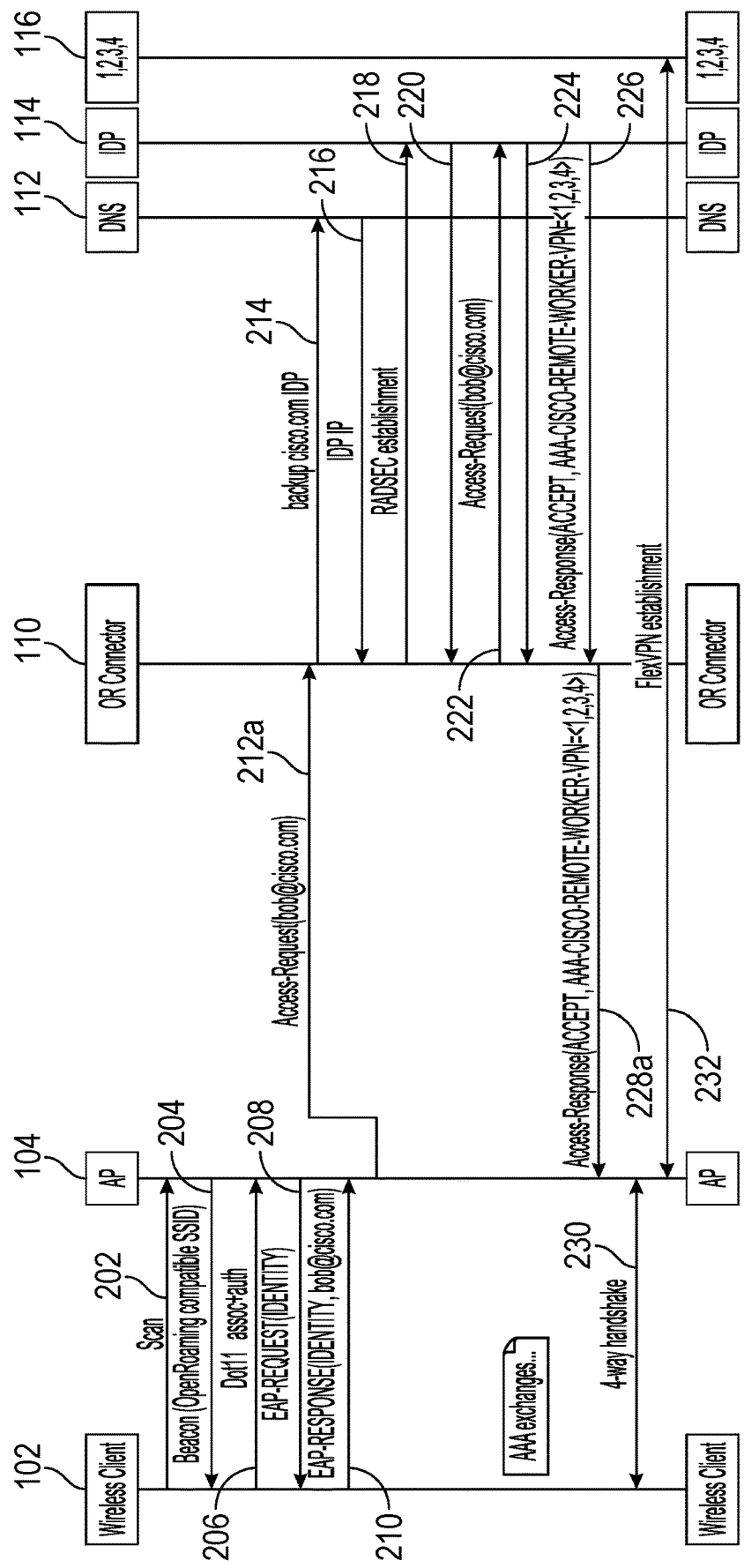
FIG. 2A is a signaling or signpost diagram of a signaling process for providing remote access in accordance with aspects of the present disclosure.
Figure 2B:
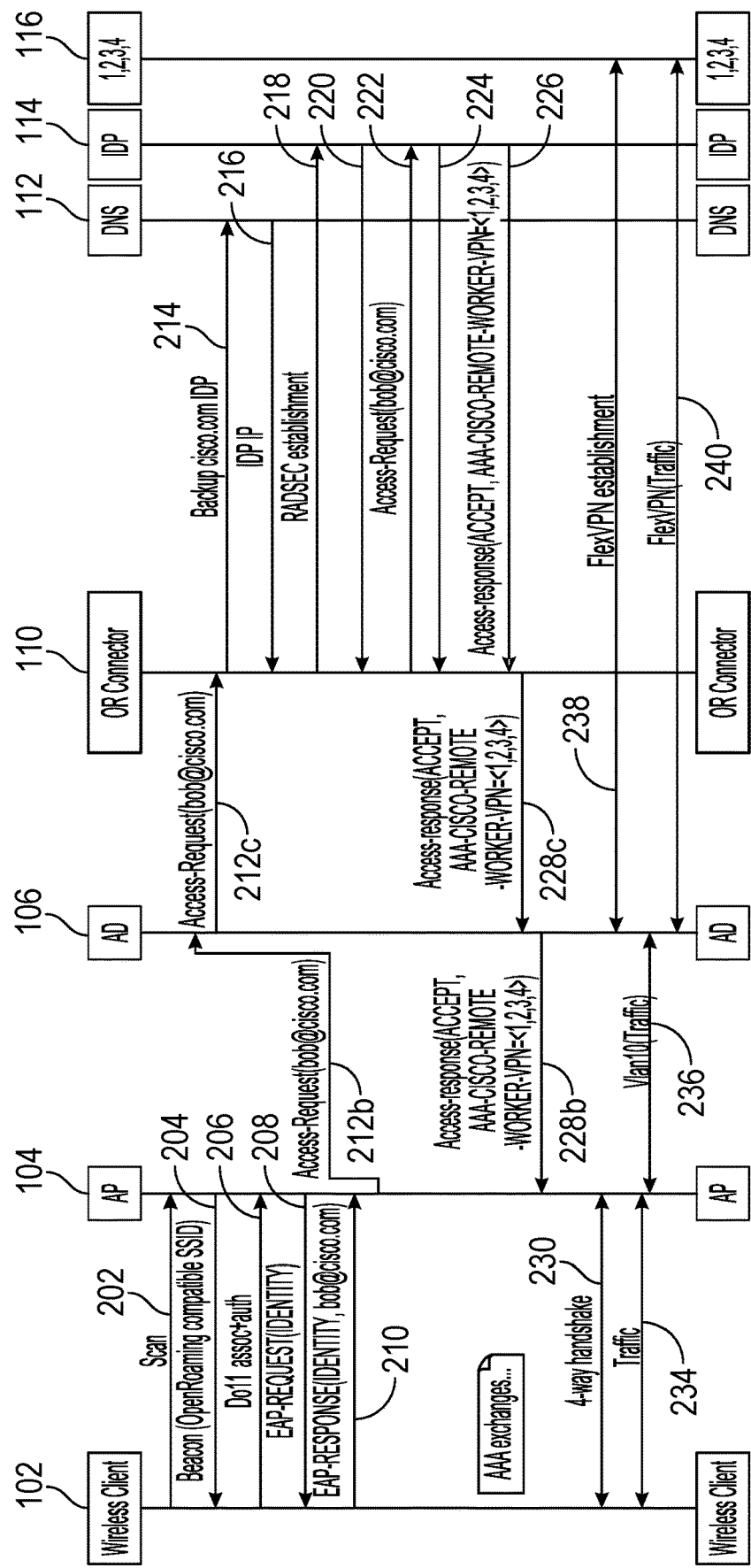
FIG. 2B is another signaling or signpost diagram of a signaling process for providing remote access in accordance with aspects of the present disclosure.

If an AD 106 is provided in the system, as shown in FIG. 1B, the AD 106 can receive the access request, in signal 212b, in stage 602. If no AD 106 is present, as shown in FIG. 1A, the access request 212a may be received by the OR connector 110. The AP interface 306, of the OR connector 110, can receive the signal 212. The AD 106 can send the access request 212c to the OR connector 110, in stage 604. Thus, the AD 106 can relay the access request, from the AP 104, to the OR connector 110, as shown in FIG. 2B.

The OR connector 110 can receive the access request, in signal 212, in stage 702. In implementations, the client interface 310 or AP interface 306 of the OR connector 110 can receive the access request 212. In other implementations, the AD interface 304, of the OR connector 110, receives access request 212c from the AD 106. Regardless of which component 102, 106 sends the access request 212, the OR connector 110 can receive the request 212, with the EAP identity, and the request for a VPN connection.

The OR connector 110 can then request an IDP from the OR domain name system of the OR server 112, in stage 704. The OR connector 110 can send message 214 with the IDP request to the OR Domain Name System (DNS) 112. The IDP request can include the SSID or VPN information in the request to determine the enterprise to which to authenticate.

The OR DNS 112 can receive the request for the IDP from the OR connector 110, in stage 804. The OR interface 302 of the OR DNS system 112 can receive signal 214 from the OR connector 110. This IDP request can be processed by the DNS and the OR DNS 112 can send an IDP Internet Protocol message 216 to the OR connector 110, in stage 806. The OR interface 302 of the OR DNS 112 can send signal 216 back to the OR connector 110, with the information on the IP address for the IDP 114 (also referred to as the company AAA server 114) to establish a RADSEC tunnel. The OR connector 110 can receive the IDP IP message. The OR connector 110 can receive the IDP IP connection, in stage 706. Here, the OR connector 110 can receive signal 216, with the IP address, for the IDP of the enterprise.

The OR connector 110 can then request the establishment of a RADSEC tunnel with the IDP, in stage 708. The OR connector 110 can send the RADSEC establishment message, to the IDP 114, in signal 218. The enterprise interface 314, of the OR connector 110, can send the message to the IDP of the company AAA server 114. The company AAA server 114 can receive the request for establishment of the RADSEC tunnel with the OR connector 110, in stage 808. Here, the OR interface 302 of the IDP 114 can receive signal 218. The signal 218 can request the establishment of the RADSEC tunnel to exchange security information, keys, and other such security data needed to authenticate the user device 102. The OR interface 302 of the IDP 114 can send response 220. Thus, by sending signal 220, the IDP 114 can establish the RADSEC tunnel with the OR connector 110, in stage 810. Upon returning the response message 220, the RADSEC tunnel 126 is established between the OpenRoaming connector 110 and the company AAA server 114. The OR connector 110 can receive signal 220 and help to establish the RADSEC tunnel, with the IDP, in stage 710.

The OR connector 110 can then send the access request signal 222 to the IDP 114, in stage 712. The OR connector 110 can send signal 222 with the access request and information of the identity of the wireless client 102 to the IDP 114. The enterprise interface 314 can establish the message with the identity and other information to send to the IDP 114. The IDP 114 can receive the access request from the OR connector 110, in stage 812. The OR interface 302 of the IDP 114 can receive the access request 222. The access request 222 can include the information from signal 212 sent from the AP 104 or AD 106. The IDP 114 can then authenticate the user and determine whether the user has access to the VPN.

The IDP 114 first may acknowledge receipt of the access request 222, in stage 814. The IDP 114 can send the acknowledgment of the access request, in signal 224, back to the OR connector 110. The OR interface 302 can send the message to acknowledge the access request and to indicate that the IDP 114 is authenticating the user. After authentication, the IDP 114 can send the access response, in stage 816. The OR interface 302, of the IDP 114, can send the access response message 226 back to the OR connector 110. The access response 226 can include the acceptance of the access request after authentication of the user, and include VPN information for the user to establish a VPN connection with the enterprise VPN 116. The VPN information can include an attribute in the response from the AAA server 114. The attribute can include a FQDN/IP address for the VPN headend 116. Also with sending the response, the AAA server 114 can also authorize the connection and VPN establishment with the VPN headend 116. In this way, the VPN can be established at the client 102 and the VPN headend 116.

The OR connector 110 can receive the acknowledgment of the access request, in stage 714, and then wait for the access response. Sometime thereinafter, the OR connector 110 can receive the access response 226, in stage 716. The enterprise interface 314 can receive signal 226 from the IDP 114. The access response 226 can include the acceptance of the access request and any VPN information.

In some implementations, the IDP 114 may reject the access request. The access response from the IDP 114, in those situations, may include an indication that the access request was not accepted. If the access request is not accepted, the OR connector 110 can forward that denial of access onto the AD 106 or the AP 104, which can send the denial onto the wireless client 102 to deny access to the VPN.

After receiving the access response 226 that accepts the connection of the client 102 from the IDP 114, the OR connector 110 can send the access response to either the AD 106 or to the AP 104, in stage 718. In some implementations, the AD interface 304, of the OR connector 110, can send signal 208c to the AD 106, which includes the access response and the VPN information. The AD 106 may receive the response, in stage 606. Thus, the OR interface 302 of the AD 106 can receive the access response message 228c. The AD 106 may then send this access response to the AP 104, in stage 608. Here, the AP interface 306 of the AD 106 can send the message 228b, with the access response onto the AP 104. Thus, the AP interface 306 sends message 228b to the AP 104.

Whether the AP interface 306 of the OR connector 110 sends message 228a to the AP 104 or the AD 106 sends messages 228b, the AP 104 can receive the access response 228, in stage 506. Here, the AD interface 304 or the OR interface 302 of the AP 104 can receive the access response message 228. The access response 228 can include information about how to connect to the VPN. For example, the attribute inserted into the response by the AAA server 114 can be extracted by the AP 104 or AD 106 for provision to the client 102. The attribute can include the FQDN/IP address for the client to connect with the VPN headend 116 to establish the VPN.

The AP may complete any other authentication or other exchanges between wireless client 102 and the AP 104, which may be forwarded to the IDP 114 or the VPN headend 116. Other AAA messages may be provided to the DSLAM 106, the SP 104, etc. Further, to establish the VPN, the SP 104 can provide an OR certificate. Then, the SP 104 and the VPN headend 116 can mutually authenticate using the OR PKI established previously. Thus, the VPN headend 116 and SP 104 can exchange keys per the PKI from the IDP server 114 and OR server 112 exchange.

The AP may then complete, with the client, the four-way handshake, in stage 508. The handshake 230 can include any of the information required to establish the VPN connection between the client 102 and the VPN headend 116. These handshake messages can include any type authentication or set up messages. Then, the AP 104 can establish a VPN connection.

In some implementations, the AP 104 can establish a VPN connection with the corporate VPN network 116, in stage 510. As shown in FIG. 1A, the AP 104 can establish the VPN connection directly with the VPN headend 116, of the corporate enterprise. This connection bypasses the AD 106 or other intermediary systems. As shown in FIG. 2A, the AP 104 can exchange the VPN establishment signals 232 with the VPN headend 116. Thus, any VPN traffic received by the AP 104 is forwarded directly to the VPN headend 116. The VPN configurer 312 of the AP 104 can complete any type of messages in the establishment signals 232 to establish the VPN for the client 102.

In other implementations, the AP 104 can establish a link with the AD 106 for client traffic, in stage 512. The AD 106 can then establish the VPN connection with signals 238. As shown in FIG. 1B, the AP 104 may provide the VPN traffic to the DSLAM 106. Thus, rather than providing the traffic directly to the company VPN headend 116, the AP 104 can provide the VPN traffic to the intermarry AD 106. Thus, as shown in FIG. 2B, the traffic received from wireless client 102, in signals 234, may be forwarded, by the AP 104, as signals 236 to the AD 106.

The AD 106 can receive signal 236 and establish the VPN connection with the company VPN headend 116, in stage 610. The AD 106 performs the functions described previously with the AP 104 to establish the VPN connection with the VPN headend 116. The VPN configurer 312 can send signals 240 from the AD 106 to the VPN headend 116 to establish the VPN connection with the VPN headend 116.

The VPN headend 116 of the corporate server can establish the VPN connection with either the AP 104 or the AD 106, in stage 818. Here, the VPN configurer 312, of the VPN headend 116, can receive signals 232 or 240 to establish the VPN connection either between the AP 104 or the AD 106. Based on the signals 232 or 240, the company VPN headend 116 establishes the VPN connection with the client 102.

In some implementations, the AD 106 may receive VLAN traffic from the AP 104, in stage 612. Here, the AD 106 may receive VLAN traffic 236 from the AP 104. The AD 106 can fork different types of traffic and/or the AP 104 may fork traffic to the AD 106. The VLAN traffic may then be forwarded along the VPN connection 240 to the VPN headend 116. In this way, VLAN traffic received at the AD 106 is sent over the VPN connection 240, in stage 614. Thus, the AD 106 functions as a router for any of the VLAN traffic for the VPN.

The VPN 116 server can receive and send traffic for the VPN to the AD 106 or the AP 104, in stage 820. Thus, regardless of which system 104, 106 is sending the VPN traffic, the VPN headend 116 can receive that VLAN traffic and communicate with the client 102 over the VPN connection 232, 240.

FIG. 9A shows computing device 900. As shown in FIG. 9A, computing device 900 may include a processing unit 910 and a memory unit 915. Memory unit 915 may include a software module 920 and a database 925. While executing on processing unit 910, software module 920 may perform, for example, processes for determining antenna power output, as described above with respect to FIGS. 1-8. Computing device 900, for example, may provide an operating environment for the controller, the APs 104, the clients 102, or the other devices, however, WLC, AP 104, client devices 102, AD 106, OR connector 110, OR server 112, AAA server 114, VPN headend 116, and other devices may operate in other environments and are not limited to computing device 900.

Computing device 900 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 900 may comprise any computer operating environment, such as hand-held devices, multiprocessor systems, microprocessor-based or programmable sender electronic devices, minicomputers, mainframe computers, and the like. Computing device 900 may also be practiced in distributed computing environments where tasks are performed by remote processing devices. The aforementioned systems and devices are examples and computing device 900 may comprise other systems or devices.

Figure 9B:
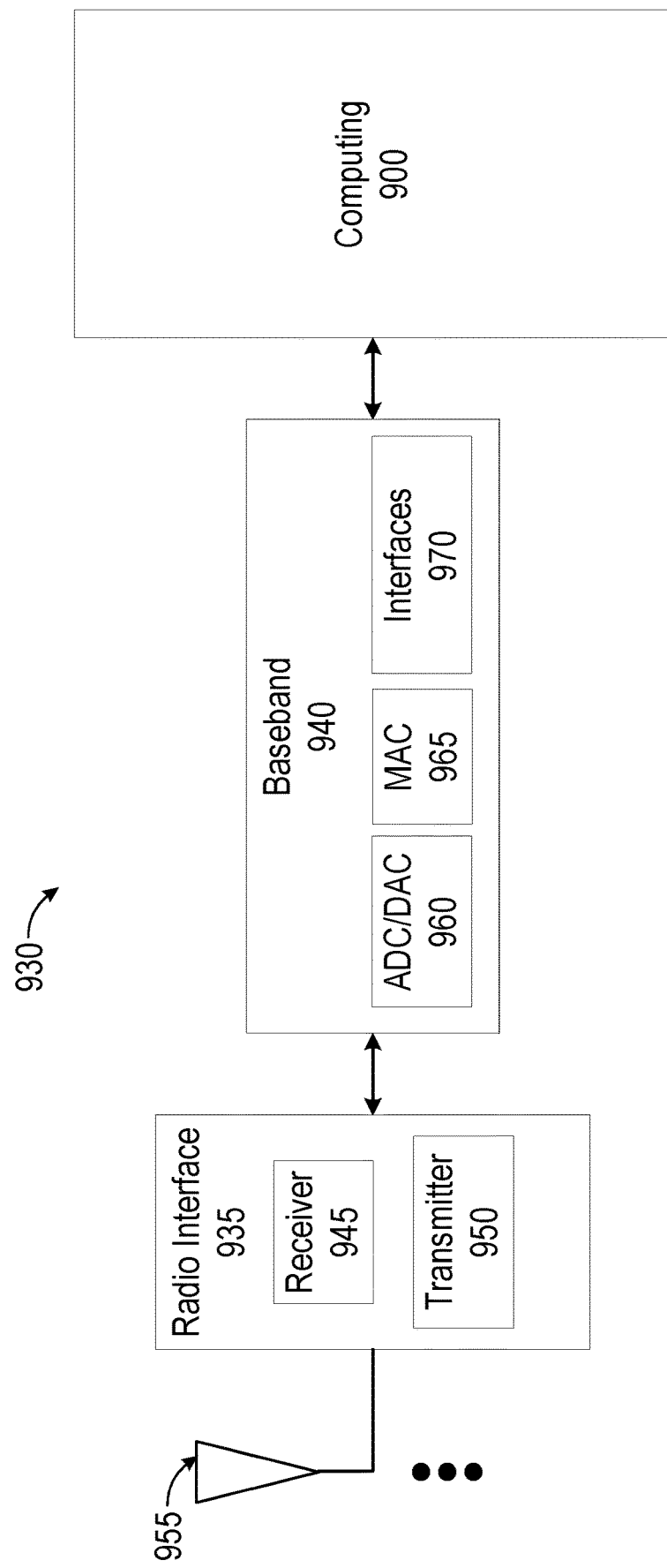
FIG. 9B is a block diagram of a wireless device in accordance with aspects of the present disclosure.

FIG. 9B illustrates an implementation of a communications device 930 that may implement one or more of APs 104, WLC, AP 104, client devices 102, AD 106, OR connector 110, OR server 112, AAA server 114, VPN headend 116, etc., of FIGS. 1-7. In various implementations, device 930 may comprise a logic circuit. The logic circuit may include physical circuits to perform operations described for one or more of WLC, AP 104, client devices 102, AD 106, OR connector 110, OR server 112, AAA server 114, VPN headend 116, etc., of FIGS. 1-8, for example. As shown in FIG. 9B, device 930 may include one or more of, but is not limited to, a radio interface 935, baseband circuitry 940, and/or computing platform 900.

The device 930 may implement some or all of the structures and/or operations for WLC, AP 104, client devices 102, AD 106, OR connector 110, OR server 112, AAA server 114, VPN headend 116, etc., of FIGS. 1-8, storage medium, and logic circuit in a single computing entity, such as entirely within a single device. Alternatively, the device 930 may distribute portions of the structure and/or operations using a distributed system architecture, such as a client-server architecture, a peer-to-peer architecture, a master-slave architecture, etc.

A radio interface 935, which may also include an analog front end (AFE), may include a component or combination of components adapted for transmitting and/or receiving single-carrier or multi-carrier modulated signals (e.g., including Complementary Code Keying (CCK), orthogonal frequency division multiplexing (OFDM), and/or Single-Carrier Frequency Division Multiple Access (SC-FDMA) symbols) although the configurations are not limited to any specific over-the-error interface or modulation scheme. The radio interface 935 may include, for example, a receiver 945 and/or a transmitter 950. Radio interface 935 may include bias controls, a crystal oscillator, and/or one or more antennas 955. In additional or alternative configurations, the radio interface 935 may use oscillators and/or one or more filters, as desired.

Baseband circuitry 940 may communicate with radio interface 935 to process, receive, and/or transmit signals and may include, for example, an Analog-To-Digital Converter (ADC) for down converting received signals with a Digital-To-Analog Converter (DAC) 960 for up converting signals for transmission. Further, baseband circuitry 940 may include a baseband or PHYsical layer (PHY) processing circuit for the PHY link layer processing of respective receive/transmit signals. Baseband circuitry 940 may include, for example, a Media Access Control (MAC) processing circuit 965 for MAC/data link layer processing. Baseband circuitry 940 may include a memory controller for communicating with MAC processing circuit 965 and/or a computing platform 900, for example, via one or more interfaces 970.

In some configurations, PHY processing circuit may include a frame construction and/or detection module, in combination with additional circuitry such as a buffer memory, to construct and/or deconstruct communication frames. Alternatively or in addition, MAC processing circuit 965 may share processing for certain of these functions or perform these processes independent of PHY processing circuit. In some configurations, MAC and PHY processing may be integrated into a single circuit.

Example of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, example of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a Random Access Memory (RAM), a Read-Only Memory (ROM), an Erasable Programmable Read-Only Memory (EPROM or Flash memory), an optical fiber, and a portable Compact Disc Read-Only Memory (CD-ROM). Node that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain example of the disclosure have been described, other examples may exist. Furthermore, although example of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, example of the disclosure may be practiced in an electrical circuit comprising discrete electronic elements, packaged or integrated electronic chips containing logic gates, a circuit utilizing a microprocessor, or on a single chip containing electronic elements or microprocessors. Example of the disclosure may also be practiced using other technologies capable of performing logical operations such as, for example, AND, OR, and NOT, including but not limited to, mechanical, optical, fluidic, and quantum technologies. In addition, example of the disclosure may be practiced within a general purpose computer or in any other circuits or systems.

Example of the disclosure may be practiced via a SOC where each or many of the element illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via an SOC, the functionality described herein with respect to example of the disclosure, may be performed via application-specific logic integrated with other components of computing device 900 on the single integrated circuit (chip).

Example of the present disclosure, for example, are described above with reference to block diagrams and/or operational illustrations of methods, systems, and computer program products according to example of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for example of the disclosure.

What is claimed is:

1. A method comprising:
   receiving, by an Access Point (AP), an access request directed to an OpenRoaming (OR) Service Set Identifier (SSID) from a client device;
   sending, by the AP, the access request to an OR connector; and
   in response to the access request, receiving, by the AP, an access response from the OR connector, wherein the access response includes an attribute indicating an address to connect to a company Virtual Private Network (VPN) headend.

2. The method of claim 1, wherein the address is a Fully Qualified Domain Name/Internet Protocol (FQDN/IP) address for the company VPN headend.

3. The method of claim 2, further comprising: configuring the OR SSID.

4. The method of claim 3, wherein the OR SSID is enabled for dot1x authentication.

5. The method of claim 3, wherein OR SSID indicates that the OR connector is an Authentication, Authorization, Accounting (AAA) server for authentication.

6. The method of claim 5, further comprising:
   extracting, by the AP, the attribute from the access response; and
   based on the attribute, establishing a VPN with the VPN headend.

7. The method of claim 6, further comprising: authenticating, by the AP, the company VPN headend using an OR Public Key Infrastructure (PKI) key.

8. The method of claim 6, further comprising: splitting, by the AP, data traffic directed to the VPN from other traffic associated with the client device.

9. The method of claim 8, wherein the access request includes an Extensible Authentication Protocol (EAP)-IDENTITY that the OR connector reads to lookup the AAA server.

10. The method of claim 9, wherein the OR connector establishes a Remote Authentication Dial-in User Service (RADIUS) over Transmission Control Protocol (TCP)/User Datagram Protocol (UDP) (RADSEC) tunnel with the AAA server to authenticate the client device.

11. A system comprising:
    a memory; and
    a processing unit coupled to the memory, wherein the processing unit is operative to:
      receive an access request directed to an OpenRoaming (OR) Service Set Identifier (SSID) from a client device;
      send the access request to an OR connector; and
      in response to the access request, receive an access response from the OR connector, wherein the access response includes an attribute indicating an address to connect to a company Virtual Private Network (VPN) headend.

12. The system of claim 11, wherein OR SSID indicates that the OR connector is an Authentication, Authorization, Accounting (AAA) server for authentication.

13. The system of claim 12, wherein the access request includes an Extensible Authentication Protocol (EAP)-IDENTITY that the OR connector reads to lookup the AAA server, and wherein the AAA server returns the access response including the attribute to the OR connector in response to the access request.

14. The system of claim 11, wherein the processing unit is further operative to: split data traffic directed to the VPN from other traffic associated with the client device.

15. The system of claim 11, the processing unit further operative to:
    extract the attribute from the access response; and
    based on the attribute, establish a VPN connection with the VPN headend.

16. A non-transitory computer-readable medium that stores a set of instructions which when executed perform a method executed by the set of instructions comprising:
    receiving an access request directed to an OpenRoaming (OR) Service Set Identifier(SSID) from a client device;
    sending the access request to an OR connector; and
    in response to the access request, receiving an access response from the OR connector, wherein the access response includes an attribute indicating an address to connect to a company Virtual Private Network (VPN) headend.

17. The non-transitory computer-readable medium of claim 16, the method further comprising: configuring the OR SSID, wherein the OR SSID is enabled for dot1x authentication, and wherein OR SSID indicates that the OR connector is an Authentication, Authorization, Accounting (AAA) server for authentication.

18. The non-transitory computer-readable medium of claim 17, wherein the access request includes an Extensible Authentication Protocol (EAP)-IDENTITY that the OR connector reads to lookup the AAA server, and wherein the AAA server returns the access response including the attribute to the OR connector in response to the access request.

19. The non-transitory computer-readable medium of claim 16, the method further comprising: splitting data traffic directed to the VPN from other traffic associated with the client device.

20. The non-transitory computer-readable medium of claim 16, the method further comprising:
   extracting the attribute from the access response;
   based on the attribute, authenticating the company VPN headend using a OR Public Key Infrastructure (PKI) key; and
   establishing a VPN connection with the VPN headend.

* * * * *